United States Patent [19]
Allison et al.

[11] Patent Number: 5,914,785
[45] Date of Patent: Jun. 22, 1999

[54] METHOD AND APPARATUS FOR MAKING ABSOLUTE RANGE MEASUREMENTS

[75] Inventors: Stephen W. Allison, Knoxville; Michael R. Cates, Oak Ridge; William S. Key, Knoxville; Alvin J. Sanders, Knoxville; Dennis D. Earl, Knoxville, all of Tenn.

[73] Assignees: The University of Tennessee Research Corporation, Knoxville; Lockheed Martin Energy Research Corporation, Oak Ridge, both of Tenn.

[21] Appl. No.: 09/018,502

[22] Filed: Feb. 4, 1998

[51] Int. Cl.[6] ........................................ G01B 5/14
[52] U.S. Cl. ................................ 356/375; 356/354
[58] Field of Search ............................ 356/375, 354

[56] References Cited

U.S. PATENT DOCUMENTS

| | | |
|---|---|---|
| 3,937,580 | 2/1976 | Kasdan ................................ 356/354 |
| 4,498,775 | 2/1985 | White ................................. 356/375 |
| 5,124,993 | 6/1992 | Braunlich et al. . | |
| 5,592,285 | 1/1997 | Pund ................................... 356/375 |

Primary Examiner—Richard A. Rosenberger
Attorney, Agent, or Firm—Rosenblatt & Redano P.C.

[57] ABSTRACT

This invention relates to a method and apparatus for making absolute distance or ranging measurements using Fresnel diffraction. The invention employs a source of electromagnetic radiation having a known wavelength or wavelength distribution, which sends a beam of electromagnetic radiation through an object which causes it to be split (hereinafter referred to as a "beamsplitter"), and then to a target. The beam is reflected from the target onto a screen containing an aperture spaced a known distance from the beamsplitter. The aperture is sized so as to produce a Fresnel diffraction pattern. A portion of the beam travels through the aperture to a detector, spaced a known distance from the screen. The detector detects the central intensity of the beam. The distance from the object which causes the beam to be split to the target can then be calculated based upon the known wavelength, aperture radius, beam intensity, and distance from the detector to the screen. Several apparatus embodiments are disclosed for practicing the method embodiments of the present invention.

21 Claims, 6 Drawing Sheets

METHOD AND APPARATUS FOR MAKING ABSOLUTE RANGE MEASUREMENTS

This invention was made with support by the U.S. Government under contract DE-AC05-96OR22464 awarded by the U.S. Department of Energy to Lockheed Martin Energy Research Corporation and the Government has certain rights in this invention.

BACKGROUND OF THE INVENTION

1. Field of the Invention

This invention relates to a method and apparatus for making absolute distance or ranging measurements using Fresnel diffraction. The invention employs a source of electromagnetic radiation having a known wavelength or wavelength distribution, which sends a beam of electromagnetic radiation through an object which causes it to be split (hereinafter referred to as a "beamsplitter"), and then to a target. The beam is reflected from the target onto a screen containing an aperture spaced a known distance from the beamsplitter. The aperture is sized so as to produce a Fresnel diffraction pattern. A portion of the beam travels through the aperture to a detector, spaced a known distance from the screen. The detector detects the central intensity of the beam. The distance from the object which causes the beam to be split to the target can then be calculated based upon the known wavelength, aperture radius, beam intensity, and distance from the detector to the screen. Several apparatus embodiments are disclosed for practicing the method embodiments of the present invention.

2. Description of the Prior Art

Prior art interferometers are unable to measure absolute distances, are costly. Interferometers are limited to relative distance measurements, rather than absolute distance measurements. Interferometers usually require a specularly reflective target surface from which light is reflected to form an interference pattern.

Other prior art methods of making distance measurements include triangularization and digital detection. Such methods have a limited range in which micron accuracy is available. This limited range is normally less than five millimeters. Such devices also have a limited accuracy, on the order of greater than one micron for ranges in excess of five millimeters. Such devices further require frequent calibration.

The present invention provides a method and apparatus for measuring absolute distances over long ranges with high precision. The present invention can be operated in either a continuous or pulsed mode, requires minimal optical alignment, provides rapid data acquisition and is capable of making measurements over a wide variety of target surface qualities including very diffuse and highly reflective surfaces.

The present invention provides extremely high accuracy in measuring absolute distances. The present invention is capable of making absolute distance measurements on the order of magnitude of a meter, with an accuracy on the order of magnitude of an 0.1 micrometers.

SUMMARY OF THE INVENTION

The present invention provides a system for making absolute distance measurements between a point and a target or between a point and a detector. The present invention utilizes Fresnel diffraction. The invention comprises an electromagnetic radiation source aimed at a target. The electromagnetic radiation source is capable of emitting a beam of electromagnetic energy having a known wavelength. The electromagnetic radiation source may be a laser.

The invention may also comprises a beamsplitter positioned between the electromagnetic radiation source and the target, at a distance, A, from the target. A screen comprising a pinhole or aperture, having radius R, or other known dimensions, a backside and a front side is positioned at a known distance, B, from the beamsplitter. The pinhole or aperture may be a polygon having sides of unequal or equal lengths. In some embodiments of the invention the target acts as the beamsplitter.

A detector is positioned a known distance, D, from the screen so as to receive a beam of electromagnetic radiation from the source and to measure the central intensity CI, of the beam. Alternatively, where no separate beamsplitter is used, the detector is positioned to receive light scattered from the target, through the aperture.

A processor is coupled to receive signals indicative of measured intensity from the detector. The processor may comprise algorithms from which preselected distances, including the distance from the target to the beamsplitter, can be calculated.

One method of the present invention employs sending a beam of electromagnetic energy having a known wavelength, $\lambda$, through a beamsplitter to a target such that the beam is reflected by the target back through the beamsplitter and emitted from the beamsplitter to an aperture having radius R, spaced a distance, B, from the beamsplitter. A portion of the beam travels through the aperture to form a Fresnel diffraction pattern on a detector spaced a distance, D, from the aperture.

The method further comprises detecting the central intensity CI, of the beam at the detector and determining the distance from the beamsplitter to the target, A, using the relationship shown in Equation 1:

$$CI = 4I_0 \sin^2\left[\frac{R^2 \pi}{2\lambda}\left(\frac{1}{(A+B)} + \frac{1}{D}\right)\right] \quad (1)$$

where $I_0$ is a calibration constant derived by determining the average intensity of the beam.

Alternatively, where the distance from the beamsplitter to the target, A, is known, the distance from the beamsplitter to the aperture B, is known, and the distance from the detector to the screen is unknown, Equation 1 can be used to solve for the distance D. The various embodiments of the present invention are suitable for providing data for all terms of Equation 1 except for one selected unknown. Equation 1 can then be algebraically manipulated to solve for any single unknown. Alternatively, numerical methods known to those skilled in the computational arts can be used to determine an unknown value using Equation 1.

Embodiments of the present invention may also employ multiple detectors spaced at different optical distances, D(n), from the beamsplitter. In such an embodiment, each detector measures a respective central intensity, CI(n). In an embodiment where there are n detectors, n simultaneous equations of the form shown in Equation 2 can be used to solve for the selected unknown variable:

$$CI(n) = 4I_0(n)\sin^2\left[\frac{R^2\pi}{2\lambda}\left(\frac{1}{(A+B)} + \frac{1}{D(n)}\right)\right] \quad (2)$$

The simultaneous equations can be solved using standard analytical and/or numerical methods known in the computational arts.

DESCRIPTION OF THE PREFERRED EMBODIMENTS

Figure 1:
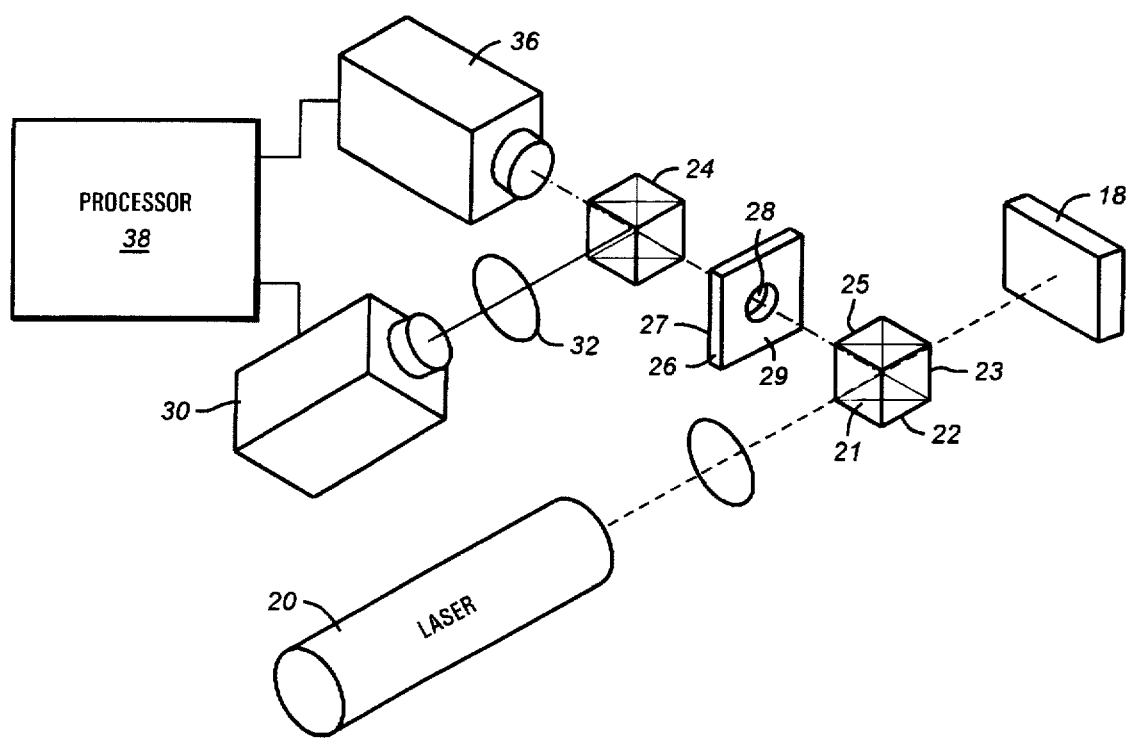
FIG. 1 is an isometric view of a first embodiment of the present invention.

A first embodiment of the present invention is depicted in FIG. 1. This embodiment is a system for making absolute distance measurements between a point and a target comprising a laser light source 20 aimed at a target 18. The laser light source is capable of producing light having a known wavelength. In a preferred embodiment, the laser light source is capable of producing polarized light.

A first beamsplitter 22 is position between the laser light source and the target at a know distance A, from the target. The beamsplitter comprises a first side 21 facing the laser light source, a second side 23 facing the target, and a third side 25 facing away from the, laser light source and the target.

A screen 26 comprising an aperture or pinhole 28 with a radius R, a backside 27, and a front side 29, facing the third side of the first beamsplitter. The screen is positioned at a known distance, B, from the beamsplitter. In a preferred embodiment, the radius, R, is within a range of 1 to 4 millimeters. The desired size of the aperture is a function of the wavelength of the light or other electromagnetic radiation used in practicing the invention, as well as other dimensions, including A and B.

A second beamsplitter 24 is positioned a distance, C, from the screen to face the back side of the screen as depicted in FIG. 1. The second beamsplitter is capable of emitting a multiplicity of beams when light is emitted through the aperture to the second beamsplitter.

A first detector is spaced apart from the second beamsplitter by a first optical path distance, D1. The first detector is positioned to receive a beam of laser light emitted from the second beamsplitter. The first detector is capable of measuring the first central intensity, CI1, of the beam.

A second detector is spaced apart from the second beamsplitter by a second optical path distance, D2, which is not equal to the first optical path distance. The second detector is positioned to receive a beam of laser light emitted from the second beamsplitter. The second detector is capable of measuring the second central intensity, CI2, of the beam.

The first embodiment of the present invention further comprises a processor 38 coupled to receive signals indicative of measured intensity, CI1 and CI2, from the first and second detectors. The processor comprises algorithms from which preselected distances can be calculated. Such algorithms may include equation (1), disclosed above.

In a preferred embodiment, the invention further comprises a piece of transparent material 32 between the screen and either the first detector or the second detector. The transparent material is capable of altering the optical path length between the screen and the detector in front of which the material is placed. The transparent material may have a variable index of refraction. Thus, it is possible for the first detector and the second detector to be equally spaced from the screen, in terms of absolute distance, but unequally spaced from the screen, in terms of optical distance, resulting from the use of the transparent material.

Figure 2:
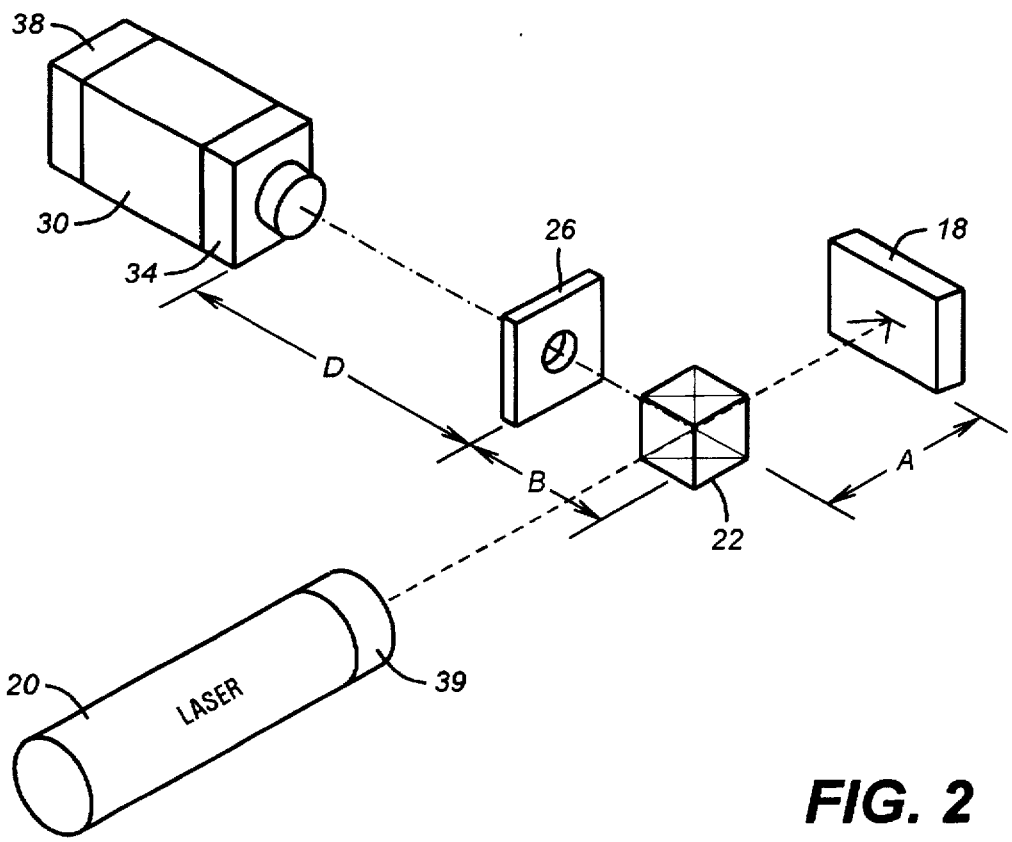
FIG. 2 is an isometric view of a second embodiment of the present invention.

A second embodiment of the present invention is depicted in FIG. 2. This embodiment is a system for making absolute distance measurements between a point and a target comprising a laser light source aimed at a target. The laser light source 20 is capable of producing light having a known wavelength. In a preferred embodiment, the laser light source is capable of selectively emitting laser light of at least two different wavelengths. In another preferred embodiment, the detector comprises a tunable filter 39 capable of filtering the wavelengths of light detected by the detector.

A beamsplitter is positioned between the laser light source and the target at a known distance, A, from the target. The beamsplitter comprises a first side facing the laser light source, a second side facing the target, and a third side facing away from the laser light source and the target.

A screen comprising an aperture or pinhole having known dimensions, a backside, and a front side facing the third side of the beamsplitter, is positioned at a known distance, B, from the beamsplitter. In a preferred embodiment, the aperture has a known radius, R. In another preferred embodiment of this invention, the pinhole does not have to be circular or constant in diameter. A variable size pinhole can be used to resolve distance ambiguities and to increase the accuracy and range of the present invention. Variation of the pinhole size, referred to herein as "aperture modulation" allows for the tuning of the sensitivity of the present invention for a particular distance.

When the only unknown in Equation 1 is R, this embodiment of the invention can be used to solve for R. Where physical properties of the screen, such as the coefficient of thermal expansion, are known, variations in R can be correlated to temperature changes. Thus, this embodiment of the present invention can be used to measure temperature changes or heat transfer where the diffraction pattern is changing as a function of changes in aperture size.

A detector is positioned a known distance, D, from the screen, on the backside of the screen, and in alignment with the screen and the beamsplitter so as to receive a beam of laser light emitted from the laser source and to measure the central intensity, CI, of the beam. In a preferred embodiment, the detector is a charged coupled device detector, hereinafter referred to as a "CCD camera".

This embodiment of the invention further comprises a processor coupled to receive signals indicative of measured central intensity, CI, from the detector. The processor comprises algorithms from which distances can be calculated.

Figure 9:
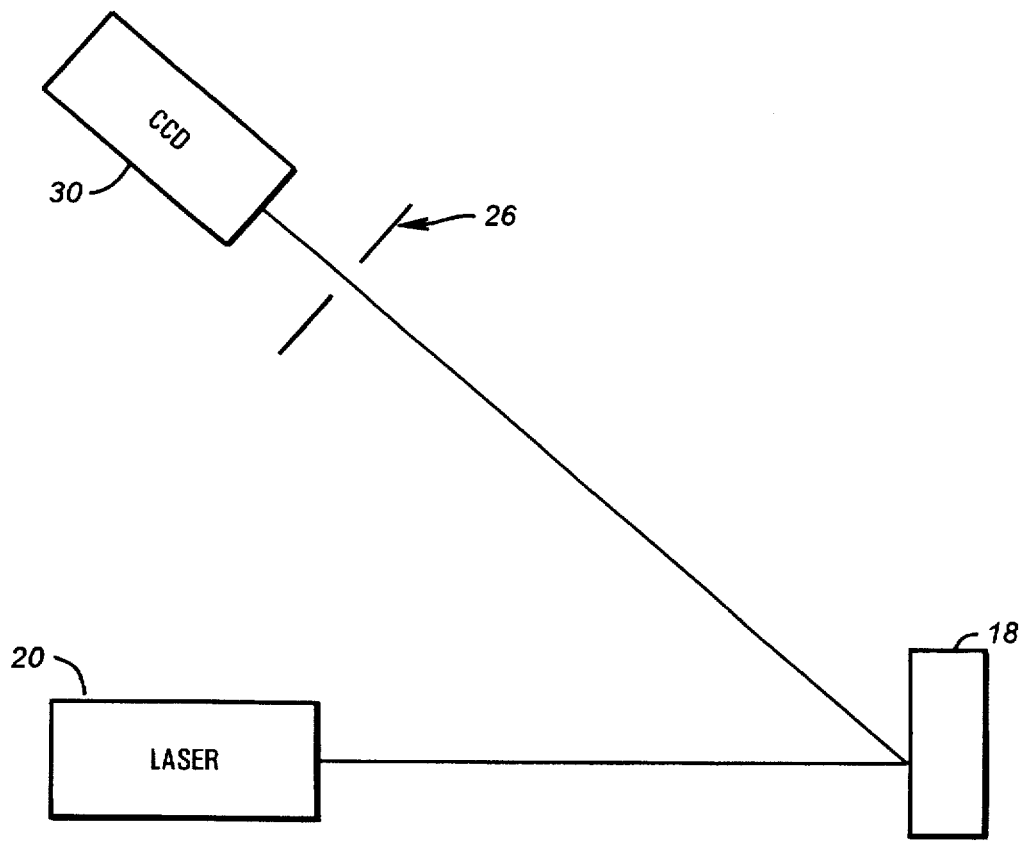
FIG. 9 is a top view of a sixth embodiment of the present invention.

An embodiment of the invention which does not comprise a separate beamsplitter is depicted in FIG. 9. This embodiment comprises a laser light source 20 aimed at a target. The laser light source is capable of producing light having a known wavelength. In a preferred embodiment, the laser light source is capable of producing polarized light. The invention further comprises a screen 26 comprising an aperture having known dimensions, a back side, and a front side facing a target. The screen is positioned at known distance, A+B, from a target.

The invention further comprises a detector 30 positioned a known distance, D, from the screen, on the back side of the screen. The detector is positioned to receive laser light that is emitted from the light source and scattered from a target. The detector is positioned to measure the intensity, CI, of the beam.

The invention further comprises a processor coupled to receive signals indicative of measured intensity, CI, from the detector. The processor comprises algorithms from which distances can be calculated.

Figure 3:
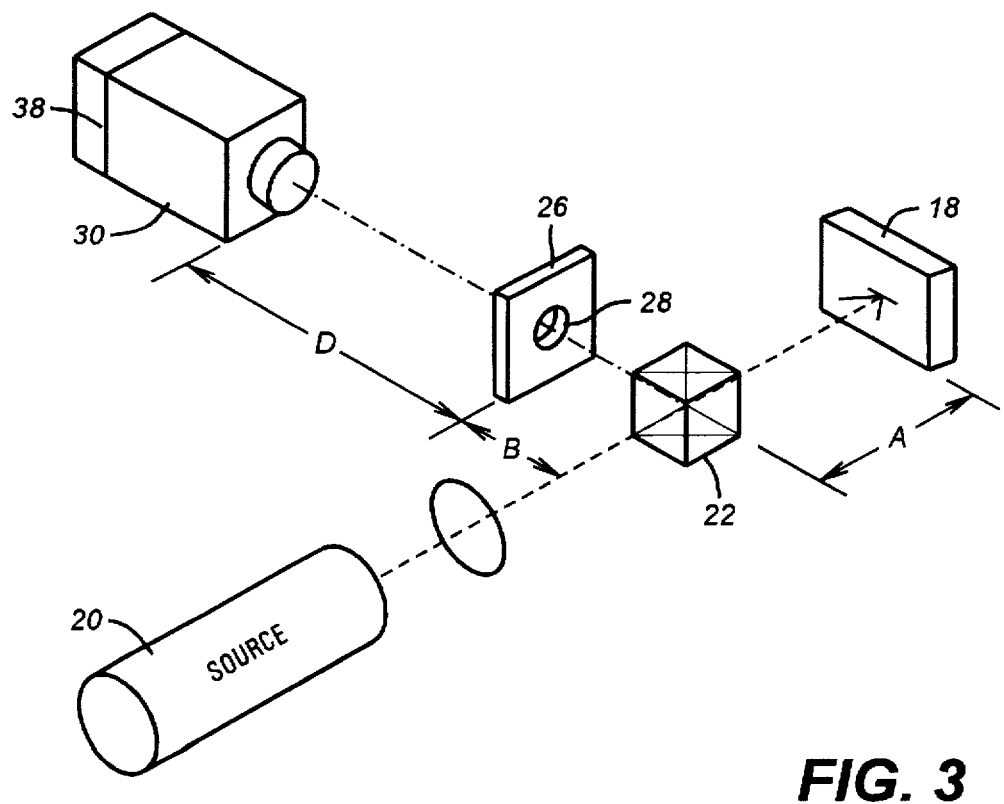
FIG. 3 is an isometric view of a third embodiment of the present invention.

Another embodiment of the present invention is depicted in FIG. 3. This embodiment comprises an electromagnetic radiation source 20 aimed at a target. In one preferred embodiment, the electromagnetic radiation source is a tunable light source. In another embodiment, the electromagnetic radiation source is a pulsed source. In another preferred embodiment, the electromagnetic radiation source emits microwaves, radio waves, ultraviolet radiation, x-rays, or noncoherent electromagnetic radiation. The source is capable of emitting a beam of electromagnetic energy having a known wavelength.

A beamsplitter is positioned between the source and the target at a distance, A, from the target. The beamsplitter comprises a first side facing the source, a second side facing the target, and a third side facing away from the target.

In a preferred embodiment, a lens 40 is positioned between the source and the beamsplitter. A screen comprising an aperture having known dimensions, a back side and a front side facing the third side of the beamsplitter, is positioned at a known distance, B, from the beamsplitter.

A detector is positioned a known distance, B, from the screen, on the back side of the screen, so as to receive a beam of electromagnetic radiation emitted from the source, and to measure the central intensity, CI, of the beam. A processor 38 is coupled to receive signals indicative of measured intensity from the detector. The processor comprises algorithms from which distances can be calculated.

Figure 4:
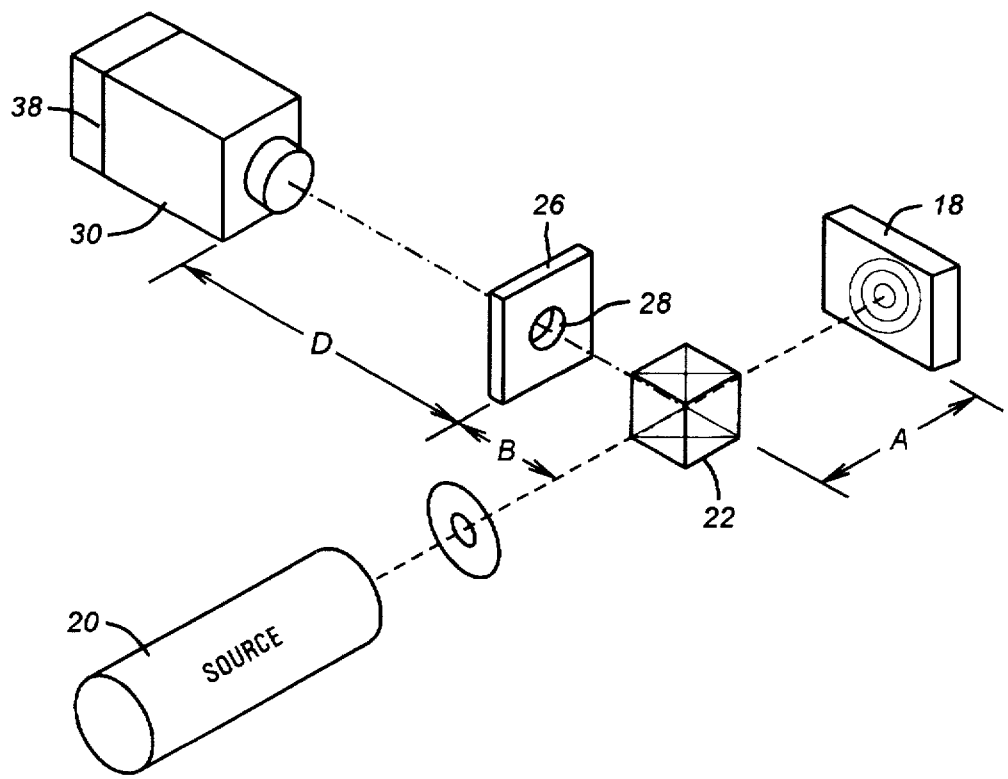
FIG. 4 is an isometric view of a fourth embodiment of the present invention.

Another embodiment to the present invention comprises a system for making distance measurements between a point and a detector, as shown in FIG. 4. This embodiment comprises an electromagnetic radiation source aimed at a target comprising a rough surface. The source is capable of emitting a beam of electromagnetic energy having a known wavelength.

A beamsplitter is positioned between the source and the target at a distance, A, from the target. The beamsplitter comprises a first side facing the source, a second source facing the target, and a third side facing away from the source and the target.

A first screen 42 comprising a first aperture 44 is positioned between the beamsplitter and the source. A second screen 26 comprising a second aperture 28, a back side and a front side, facing the third side of the beamsplitter is positioned at a distance, B, from the beamsplitter.

A detector is positioned to receive light passing through the second aperture. The detector faces the back side of the second screen. In a preferred embodiment, the detector is a CCD camera. In another preferred embodiment, the detector comprises a variable size opening. When the opening is adjusted to a larger size setting, it allows the detector to detect light from a large diffraction pattern as needed to calculate $I_0$ in Equation 1. When the lens opening is set to a smaller setting, it allows the detector to detect only the central intensity, CI.

A processor is coupled to receive signals indicative of measured intensity from the detector. The processor comprises algorithms from which distances can be calculated.

Figure 5:
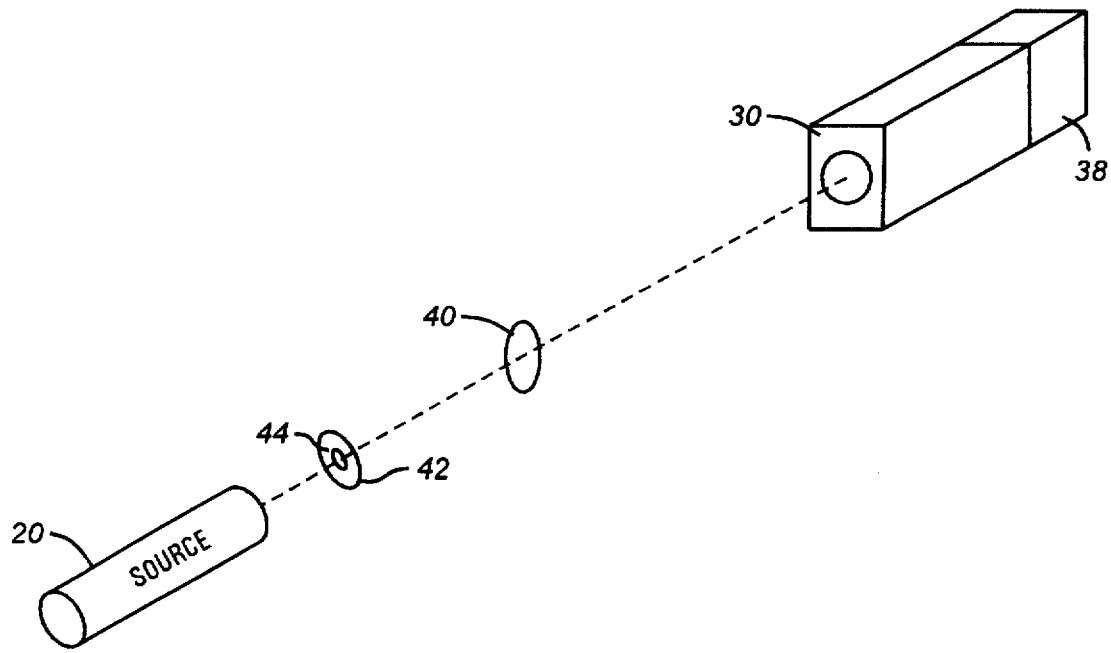
FIG. 5 is an isometric view of a fifth embodiment of the present invention.

Another embodiment of the present invention is depicted in FIG. 5. This embodiment is a system for making distance measurements between a point and a detector. This embodiment of the invention comprises an electromagnetic radiation source aimed at a target. The source is capable of emitting a beam of electromagnetic energy having a known wavelength. A detector is positioned to receive a beam from the source.

A first screen 42 comprising an aperture 44 is positioned between the detector and the source such that the projection of a beam from the source through the aperture produces a diffraction pattern.

A lens 40 is positioned between the first screen and the detector. The lens is positioned so as to compress or stretch the intensity variation as a function of distance from the pinhole to the source resulting from the projection of the beam through the aperture.

Figure 6:
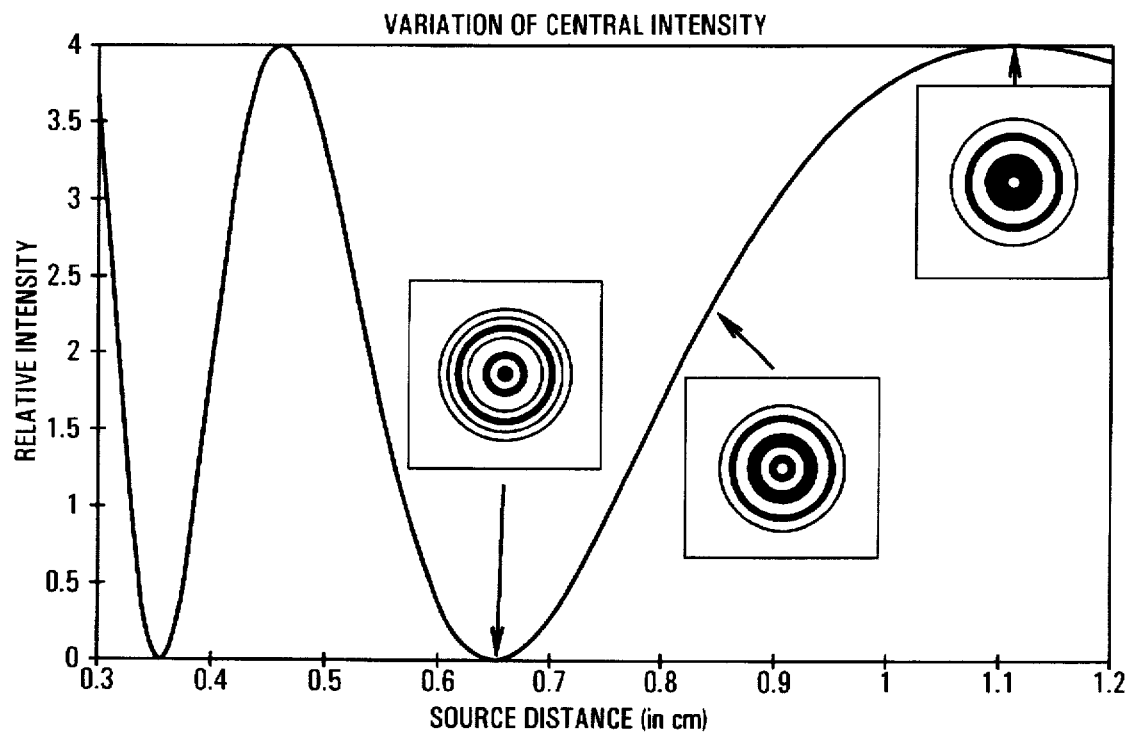
FIG. 6 is a graph of central intensity versus source distance.

FIG. 6 depicts a typical graph of central intensity versus source distance. As shown in FIG. 6, the intensity plotted as a function of source distance is a wavelike function. The compression or stretching of the diffraction pattern that is accomplished through the use of a lens refers to a stretching or compression of the lengths of cycles of the sinusoid depicted in FIG. 6. Where the focal length of the lens is less than the distance from the pinhole to the lens a compression results. Where the focal length of the lens is greater than the distance from the pinhole to the lens, a stretching results.

The invention further comprises a processor coupled to receive signals indicative of measured beam intensity from the detector. The processor comprised algorithms from which distances can be calculated.

Figure 7:
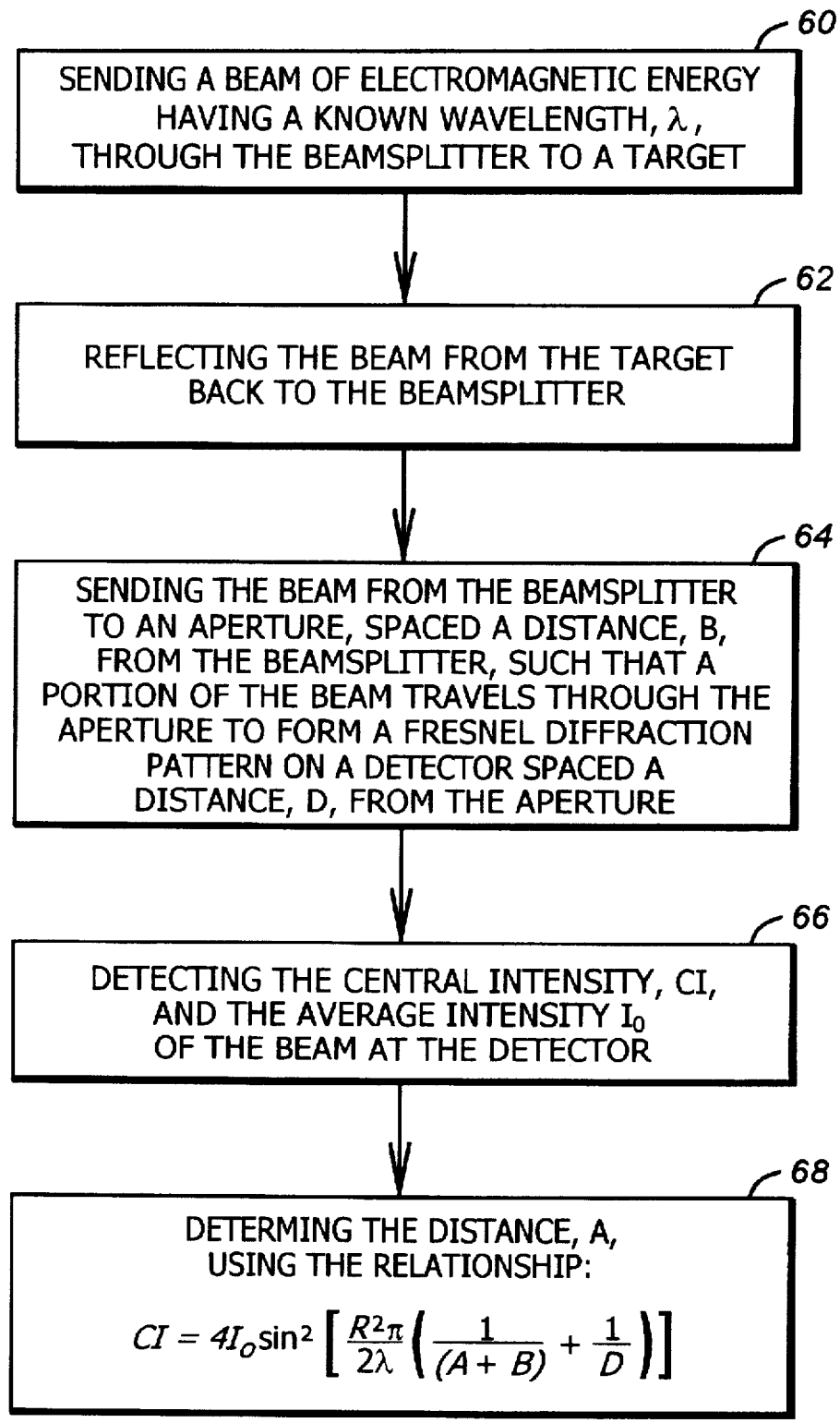
FIG. 7 is a block diagram of a first method embodiment of the present invention.

The present invention also comprises methods for measuring absolute distance. A first method embodiment of the present invention is shown in FIG. 7. This method comprises sending a beam of electromagnetic energy having a known wavelength, λ, through a beamsplitter to a target as shown in block 60 of FIG. 7. The beam is then reflected from the target back to the beamsplitter as shown in block 62 of FIG. 7. The beam is sent from the beamsplitter to an aperture, spaced a distance, B, from the beamsplitter, such that a portion of the beam travels through the aperture to form a Fresnel diffraction patter on a detector space a distance, D, from the aperture, as shown in block 64 of FIG. 7.

The method further comprises detecting the central intensity, CI, and the average intensity, $I_0$, of the beam at the detector, as shown in block 66 of FIG. 7. The absolute distance, A, between the beamsplitter and the target is then determined using the relationship shown in Equation 1, as shown in block 68 of FIG. 7.

Figure 8:
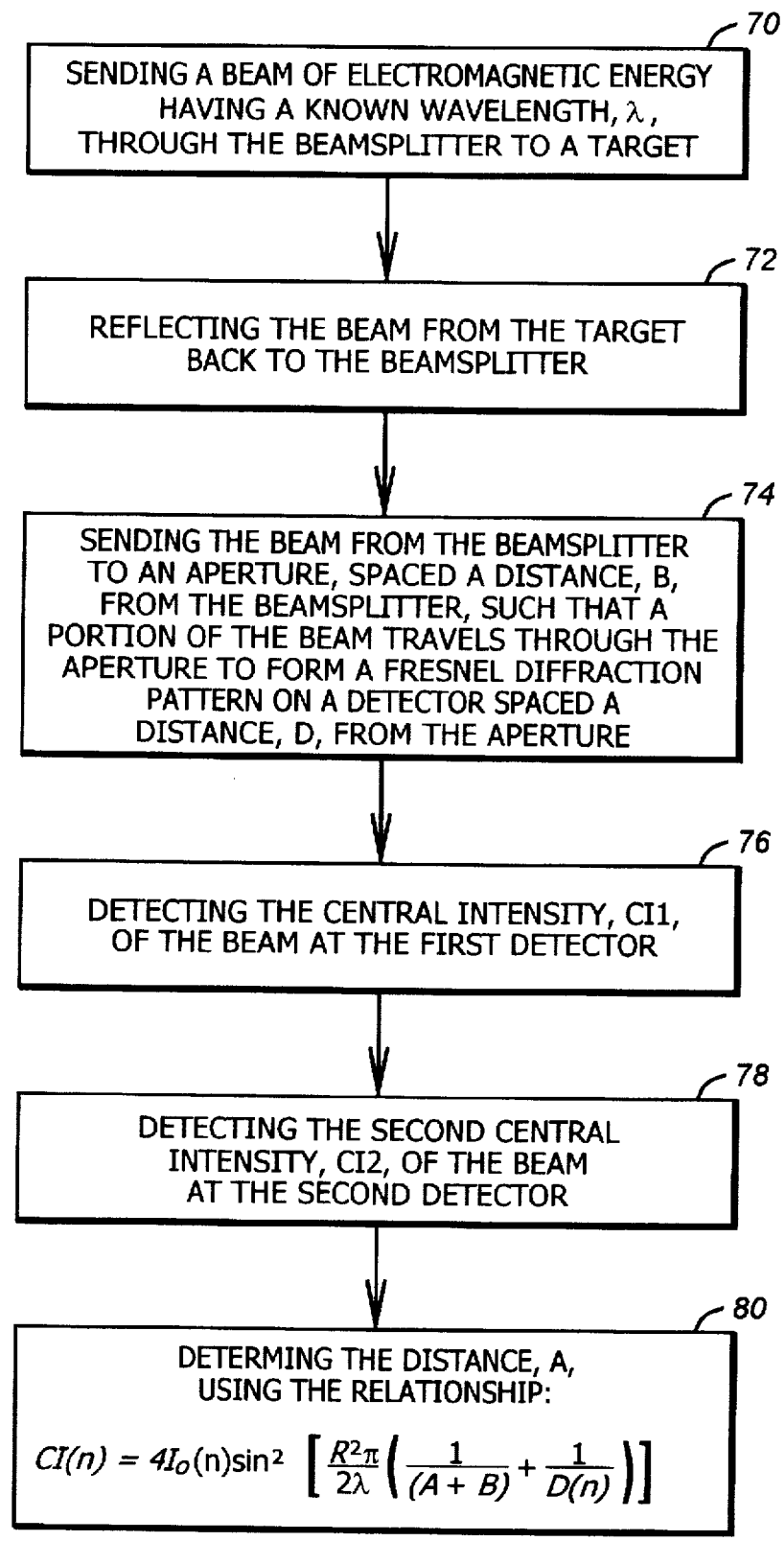
FIG. 8 is a block diagram of a second method embodiment of the present invention.

A second method embodiment of the present method invention is shown in FIG. 8. This method comprises sending a beam of electromagnetic energy having a known wavelength, λ, through the beamsplitter to a target, as shown in block 70 of FIG. 8. The beam is then reflected from the target back to the beamsplitter, as shown in block 72 of FIG. 8. The beam is sent from the beamsplitter to an aperture, spaced a distance, B, from the beamsplitter, such that a first portion of the beam travels through the aperture to a first Fresnel diffraction pattern on a first detector space a distance, D1, from the aperture and a second portion of the beam travels through the aperture to form a second Fresnel diffraction pattern on a second detector spaced a distance, D2, from the aperture, as shown in block 74 of FIG. 8.

The method further comprises detecting a first central intensity, CI1, of the beam at the first detector, as shown in block 76 of FIG. 8. A second central intensity, CI2, of the beam is detected at the second detector, as shown in block 78 of FIG. 8. The absolute distance, A, between the beamsplitter and the target is then determined using the relationship shown in Equation 2, as shown in block 80 of FIG. 8.

The foregoing disclosure and description of the invention are illustrative and explanatory. Various changes in the size, shape, and materials, as well as in the details of the illustrative construction may be made without departing from the spirit of the invention.

What is claimed is:

1. A system for making absolute distance measurements between a point and a target, comprising:
   a. a laser light source aimed at a target, said laser light source being capable of producing light having a known wavelength;
   b. a first beamsplitter positioned between said laser light source and a target at a known distance, A, from a target, said beamsplitter comprising a first side facing said laser light source, a second side facing said target and a third side facing away from said laser light source and said target;
   c. a screen comprising an aperture with a known radius, R, a back side, and a front side facing said third side of said first beamsplitter, said screen being positioned at a known distance, B, from said beamsplitter;
   d. a second beamsplitter positioned a known distance, C, from said screen to face the back side of said screen, said beamsplitter being capable of emitting a multiplicity of beams when light is emitted through said aperture to said second beamsplitter;
   e. a first detector spaced apart from said second beamsplitter by a first optical path distance, D1, said first detector being positioned to receive a beam of laser light emitted from said second beamsplitter, said first detector being capable of measuring the first central intensity CI1 of said beam;
   f. a second detector spaced apart from said second beamsplitter by a second optical path distance, D2, that does not equal said first optical path distance, said second detector being positioned to receive a beam of laser light emitted from said second beamsplitter, said second detector being capable of measuring the second central intensity CI2 of said beam; and
   g. a processor coupled to receive signals indicative of measured intensities, CI1 and CI2, from said first and second detectors and comprising algorithms from which distances can be calculated.

2. The system of claim 1, further comprising a piece of transparent material positioned between said screen and said first detector or said second detector.

3. A system for making absolute distance measurements between a point and a target, comprising:
   a. a laser light source aimed at a target, said laser light source being capable of producing light having a known wavelength;
   b. a beamsplitter positioned between said laser light source and a target at a known distance, A, from a target, said beamsplitter comprising a first side facing said laser light source, a second side facing said target and a third side facing away from said laser light source and said target;
   c. a screen comprising an aperture having known dimensions, a back side, and a front side facing said third side of said beamsplitter, said screen being positioned at a known distance, B, from said beamsplitter;
   d. a detector positioned a known distance, D, from said screen, on the back side of said screen, said detector being positioned to receive a beam of laser light emitted from said laser light source and to measure the intensity, CI, of said beam; and
   e. a processor coupled to receive signals indicative of measured intensity, CI, from said detector and comprising algorithms from which preselected distances can be calculated.

4. The system of claim 3, wherein said detector comprises a CCD camera.

5. The system of claim 3, wherein said aperture has a known radius, R.

6. The system of claim 3, wherein the size of said aperture is controllably variable.

7. The system of claim 3, wherein said laser source is capable of selectively emitting laser light of at least two different wavelengths and wherein said detector comprises a tunable filter capable of filtering the wavelength of light detected by said detector.

8. A system for making absolute distance measurements between a point and a target, comprising:
   a. an electromagnetic radiation source aimed at a target, said source being capable of emitting a beam of electromagnetic energy having a known wavelength;
   b. a beamsplitter positioned between said source and a target, at a known distance, A, from a target, said beam splitter comprising a first side facing said source, a second side facing said target and a third side facing away from said source and said target;
   c. a screen comprising an aperture having known dimensions, a back side, and a front side facing said third side of said beamsplitter said screen being positioned at a known distance, B, from said beamsplitter;
   d. a detector positioned a known distance, D, from said screen, on the back side of said screen being positioned to receive a beam of electromagnetic radiation emitted from said source and to measure the central intensity, CI, of said beam; and
   e. a processor coupled to receive signals indicative of measured intensity from said detector and comprising algorithms from which distances can be calculated.

9. The system of claim 8, wherein said source is a tunable wavelength light source.

10. The system of claim 8, wherein said source emits microwaves or radio waves.

11. The system of claim 8, wherein said source emits ultraviolet radiation or x-rays.

12. The system of claim 8, wherein said source is a pulsed source.

13. The system of claim 8, wherein said source emits noncoherent electromagnetic radiation.

14. The system of claim 8, further comprising a lens positioned between said source and said beamsplitter.

15. A system for making distance measurements between a point and a detector, comprising:

a. an electromagnetic radiation source aimed at a target comprising a rough surface, said source being capable of emitting a beam of electromagnetic energy having a known wavelength;

b. a beamsplitter positioned between said source and a target, at a known distance, A, from a target, said beamsplitter comprising a first side facing said source, a second side facing said target and a third side facing away from said source and said target;

c. a first screen comprising a first aperture having known dimensions, said first screen positioned between said beamsplitter and said source;

d. a second screen comprising a second aperture having known dimensions, a back side, and a front side facing said third side of said beamsplitter said screen being positioned at a known distance, B, from said beamsplitter;

e. a detector positioned to receive light passing through said second aperture, said detector facing the backside of said second screen; and f. a processor coupled to receive signals indicative of measured intensity from said detector and comprising algorithms from which distances can be calculated.

16. The system of claim 15, wherein said detector is a CCD camera.

17. The system of claim 15, wherein said detector comprises a variable size lens opening.

18. A system for making distance measurements between a point and a detector, comprising:

a. an electromagnetic radiation source aimed at a target, said source being capable of emitting a beam of electromagnetic energy having a known wavelength;

b. a detector positioned to receive a beam from said source;

c. a first screen comprising an aperture positioned between, and in alignment with, said detector and said source such that the projection of a beam from said source through said aperture produces a diffraction pattern;

d. a lens positioned between said first screen and said detector, said lens being positioned so as to compress or stretch a diffraction pattern resulting from the projection of said beam through said aperture; and e. a processor coupled to receive signals indicative of measured intensity from said detector and comprising algorithms from which distances can be calculated.

19. A method for measuring the absolute distance, A, between a beamsplitter and a target, comprising:

a. sending a beam of electromagnetic energy having a known wavelength, $\lambda$, through the beamsplitter to a target;

b. reflecting the beam from the target back to the beamsplitter; sending the beam from the beamsplitter to an aperture, spaced a distance, B, from the beamsplitter, such that a portion of the beam travels through the aperture to form a Fresnel diffraction pattern on a detector spaced a distance, D, from the aperture;

c. detecting the central intensity, CI, of the beam at the detector;

d. detecting the average intensity $I_0$ of the beam at the detector; and e. determining the distance, A, using the relationship:

$$CI = 4I_0 \sin^2\left[\frac{R^2\pi}{2\lambda}\left(\frac{1}{(A+B)} + \frac{1}{D}\right)\right].$$

20. A method for measuring the absolute distance, A, between a beamsplitter and a target, comprising a. sending a beam of electromagnetic energy having a known wavelength, $\lambda$, through the beamsplitter to a target;

b. reflecting the beam from the target back to the beamsplitter;

c. sending the beam from the beamsplitter to an aperture, spaced a distance, B, from the beamsplitter, such that a portion of the beam travels through the aperture to form a Fresnel diffraction pattern on a detector spaced a distance, D, from the aperture;

d. detecting the central intensity, CI1, of the beam at the first detector;

e. detecting the second central intensity, CI2, of the beam at the second detector; and f. determining the distance, A, using the relationship:

$$CI(n) = 4I_0(n)\sin^2\left[\frac{R^2\pi}{2\lambda}\left(\frac{1}{(A+B)} + \frac{1}{D(n)}\right)\right].$$

21. A system for making absolute distance measurements between a point and a target, comprising:

a. a laser light source aimed at a target, said laser light source being capable of producing light having a known wavelength;

b. a screen comprising an aperture having known dimensions, a back side, and a front side facing a target, said screen being positioned at a known distance, A+B, from a target;

c. a detector positioned a known distance, D, from said screen, on the back side of said screen and positioned so as to receive laser light emitted from said laser light source that is scattered from a target and to measure the intensity, CI, of said beam; and d. a processor coupled to receive signals indicative of measured intensity, CI, from said detector and comprising algorithms from which distances can be calculated.

* * * * *